US009069104B2

(12) United States Patent
Datta et al.

(10) Patent No.: US 9,069,104 B2
(45) Date of Patent: Jun. 30, 2015

(54) PATHWAY MANAGEMENT USING MODEL ANALYSIS AND FORECASTING

(71) Applicant: International Business Machines Corporation, Armonk, NY (US)

(72) Inventors: Ankur Datta, White Plains, NY (US); Rogerio S. Feris, Hartford, CT (US); Sharathchandra U. Pankanti, Darien, CT (US); Yun Zhai, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 13/711,685

(22) Filed: Dec. 12, 2012

(65) Prior Publication Data

US 2014/0164306 A1    Jun. 12, 2014

(51) Int. Cl.
  *G06N 5/00* (2006.01)
  *G01W 1/10* (2006.01)
  *G06T 17/05* (2011.01)
  *G09B 29/00* (2006.01)

(52) U.S. Cl.
  CPC .............. *G01W 1/10* (2013.01); *G06T 17/05* (2013.01); *G09B 29/007* (2013.01)

(58) Field of Classification Search
  None
  See application file for complete search history.

(56) References Cited

U.S. PATENT DOCUMENTS

| | | | |
|---|---|---|---|
| 7,046,841 B1* | 5/2006 | Dow et al. | 382/154 |
| 7,720,605 B2* | 5/2010 | Welty et al. | 702/2 |
| 2005/0279069 A1* | 12/2005 | Novembri et al. | 56/13.1 |
| 2009/0076726 A1 | 3/2009 | Gemignani, Jr. et al. | |
| 2010/0198775 A1 | 8/2010 | Rousselle et al. | |
| 2010/0205219 A1 | 8/2010 | Rousselle et al. | |
| 2012/0019622 A1 | 1/2012 | Rousselle et al. | |
| 2012/0022822 A1 | 1/2012 | Rousselle et al. | |
| 2012/0027298 A1 | 2/2012 | Dow et al. | |
| 2012/0072039 A1* | 3/2012 | Anderson et al. | 700/291 |
| 2012/0330549 A1* | 12/2012 | Dannevik et al. | 702/3 |

OTHER PUBLICATIONS

Kobayashi et al. "Satellite Imagery for the Identification of Interference with Overhead Power Lines—Final Project Report," Power Systems Engineering Research Center (PSERC), Sections 1-10; pp. 1-65; PSERC Publication 08-02, Jan. 2008, © 2007 Arizona State University.

* cited by examiner

*Primary Examiner* — Alan Chen
(74) *Attorney, Agent, or Firm* — Isaac J. Gooshaw

(57) ABSTRACT

A computer generates a three dimensional map of a pathway area using a plurality of overhead images. The computer determines a forecasted weather pattern to occur in the pathway area. The computer analyzes the three dimensional map and the forecasted weather pattern to predict one or more violations of the pathway. The computer generates a priority for the one or more predicted violations of the pathway. The computer generates a plan for pathway management of the pathway area.

20 Claims, 3 Drawing Sheets

US 9,069,104 B2

PATHWAY MANAGEMENT USING MODEL ANALYSIS AND FORECASTING

FIELD OF THE INVENTION

The present invention relates generally to the field of pathway management, and more particularly to vegetation management in or near a pathway corridor.

BACKGROUND OF THE INVENTION

For many utilities, vegetation is the number-one cause of all unplanned distribution outages. Most damage to electric utility systems during storms is caused by a falling tree or branch that takes power lines out of service. In order to help reduce the frequency of tree damage to utility systems, many utilities implement vegetation management programs as a preventative measure.

Traditionally, vegetation management programs have relied on regular surveying and pruning by arborist teams to help control vegetation around utility systems, but the sheer number of utility lines covering vast distances makes it impractical, in many cases, to send survey teams on the ground. Even so, it is often necessary for field personnel to visit the site in person in order to decide the type of maintenance needed to resolve the encroachment of the vegetation.

In an effort to expedite the process of vegetation management, many utility companies utilize aerial reconnaissance techniques to provide photographic imagery of their utility systems which can be examined for possible vegetation growth issues. Typically, aerial photography, light detection and ranging (LIDAR), synthetic aperture radar, thermal imaging and other types of remote sensing technologies capture digital imagery of real-world scenes for the purpose of extracting three-dimensional point coordinate (spatial geometry) data. These technologies, though cost prohibitive, are widely used in industry to collect the data necessary for map-making, and capture spatial (point coordinate) data in a digital form that allows a wide variety of computer-based tools to be applied to the tasks of map-making, 3D modeling for engineering analysis, vegetation assessment/management, and/or asset management.

SUMMARY

Embodiments of the present invention disclose a method, computer program product, and system for pathway management. A computer generates a three dimensional map of a pathway area using a plurality of overhead images. The computer determines a forecasted weather pattern to occur in the pathway area. The computer analyzes the three dimensional map and the forecasted weather pattern to predict one or more violations of the pathway. The computer generates a priority for the one or more predicted violations of the pathway. The computer generates a plan for pathway management of the pathway area.

DETAILED DESCRIPTION

Figure 1:
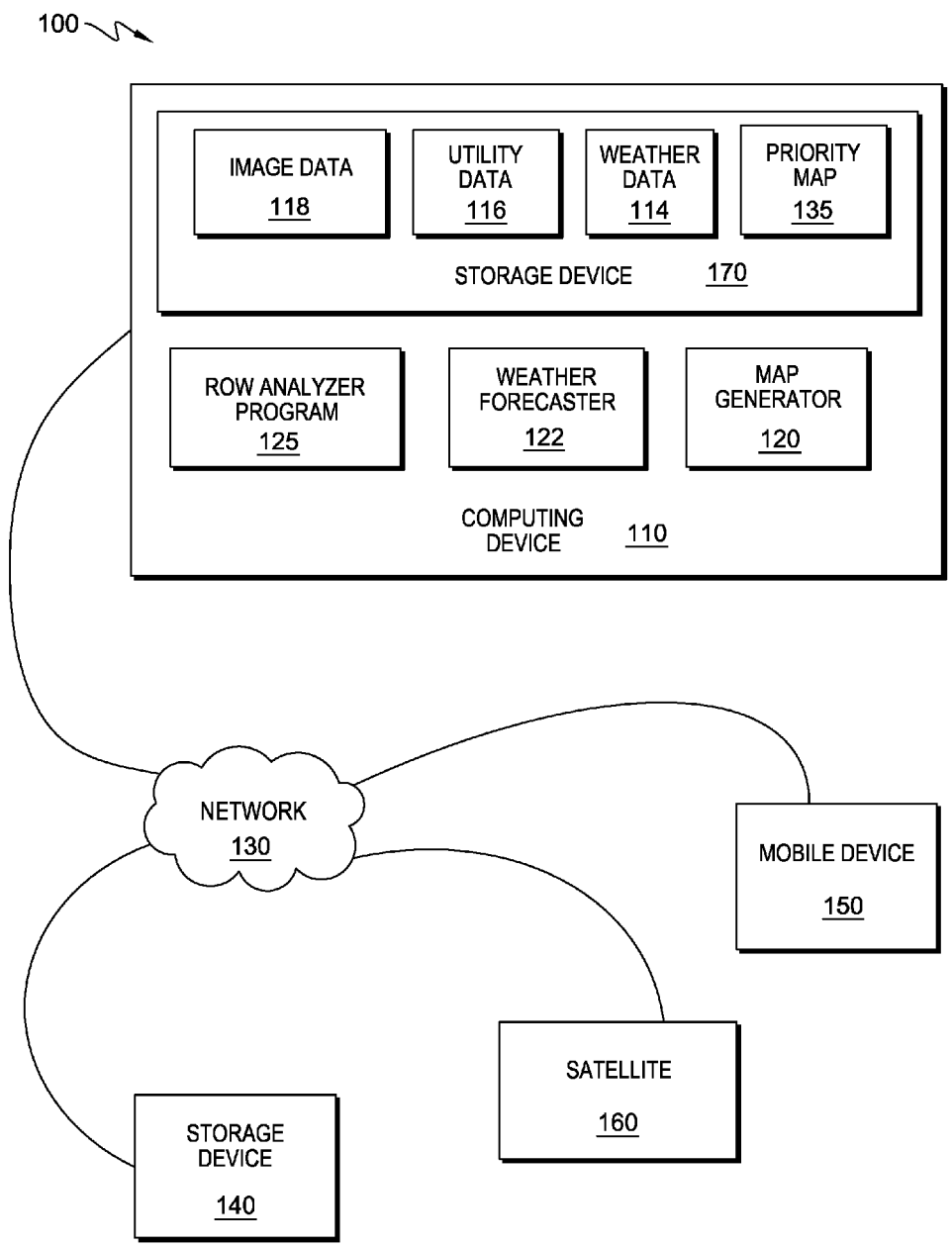
FIG. 1 is a functional block diagram illustrating a pathway management environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Three-dimensional (3D) coordinate point data and 3D imagery of a real-world scenes are often used in the field when vegetation management is performed. The location of individual points in 3D space can be compared to the locations of recognizable objects within the real-world scene and a determination made as to whether or not specific clearance distances are maintained between the recognizable objects (e.g., a power line) and a potential violating object (e.g., a tree).

The task of discerning the existence of clearance violations (a.k.a., interferences) between a recognizable object and a potential violating object, within the real-world scene of multiple available objects, is often carried out using computer analysis. Few methods/approaches lend themselves to being implemented "in the field" or out in the physical real world where the physical objects actually exist. The data processing events, computing power/equipment requirements, and data volumes are often simply too large to easily handle in the field using current approaches. Meanwhile, manual methods require gross estimates of changing physical conditions and accuracy is limited, so solutions to vegetation management such as clear-cutting currently prevail.

The present invention will now be described in detail with reference to the Figures. FIG. 1 is a functional block diagram illustrating a pathway management environment, generally designated 100, in accordance with one embodiment of the present invention.

In this exemplary embodiment, a pathway can include a trail, a street/roadway, a sidewalk, a track, a path, a railway, a body of water (such as a stream, a river, or a lake), a right of way, or another equivalent structure known to those skilled in the art. To keep the description simple, the pathway in this exemplary embodiment will often be referred to as a right of way (ROW), which is not to be interpreted as a limitation.

Pathway management environment 100 includes computing device 110, satellite 160, storage device 140 and mobile device 150, all interconnected over network 130. Computing device 110 includes ROW analyzer program 125, map generator 120, weather forecaster 122, and storage device 170, which further includes priority map 135, weather data 114, utility data 116, and image data 118.

In alternative embodiments, ROW analyzer program 125, map generator 120, weather forecaster 122, priority map 135, weather data 114, utility data 116, and image data 118 may be stored externally to computing device 110 and accessed through network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, storage device 140, and mobile device 150 in accordance with a exemplary embodiment of the present invention.

In various embodiments of the present invention, computing device 110, satellite 160, storage device 140, and mobile device 150 can be servers, laptop computers, tablet computers, netbook computers, personal computers (PCs), desktop computers, personal digital assistants (PDAs), smart phones, satellites or any programmable electronic device capable of communication via network 130. In other exemplary embodiments, computing device 110 represents a computing system utilizing clustered computers and components to act as a single pool of seamless resources. In general, computing device 110 can be any computing device or a combination of devices with access to ROW analyzer program 125, map generator 120, weather forecaster 122, storage device 170, priority map 135, weather data 114, utility data 116, and image data 118, and is capable of executing ROW analyzer program 125, weather forecaster 122, and map generator 120. Computing device 110, satellite 160, and mobile device 150 may include internal and external hardware components, as depicted and described in further detail with respect to FIG. 3.

In an exemplary embodiment, satellite 160 is a satellite in orbit around the planet Earth. Satellite 160 is capable of taking images of the Earth with sufficient resolution to distinguish vegetation. The images taken of the Earth are sent to map generator 120 as needed or requested. In some embodiments, the images are sent to a database, such as storage device 140, for storage and access by map generator 120.

In an exemplary embodiment, storage device 140 is a storage device that stores information such as satellite images, records of weather, and utility information such as maps with the location of transmission/distribution assets. Typically, this information is accessed as needed by computing device 110 via network 130. In some embodiments, storage device 140 is integral with computing device 110.

In an exemplary embodiment, mobile device 150 is a portable computing device such as a laptop, tablet, smartphone, or PDA. In general, mobile device 150 is operated by a user located in the field (i.e. in or near the ROW corridor). Mobile device 150 can send and receive data such as ROW maps, work schedules, and progress updates via network 130.

In some embodiments, the functions of ROW analyzer program 125, map generator 120, weather forecaster 122, storage device 170, priority map 135, weather data 114, utility data 116 and image data 118 can be included in a single program or in a combination of programs operating on computing device 110. In general, the individual functions of ROW analyzer program 125, map generator 120, weather forecaster 122, storage device 170, priority map 135, weather data 114, utility data 116 and image data 118 require computational and data storage requirements that can exceed the capabilities of individual computing devices. Therefore, in an exemplary embodiment computing device 110 can be best represented as a cloud computing system capable of meeting the computational and data storage requirements.

In an exemplary embodiment, on computing device 110, ROW analyzer program 125 generates ROW (pathway) management maps and work schedules. The generated ROW maps and work schedules are saved as priority map 135 in storage device 170. Storage device 170 is, in general, a computer readable memory, included in computing device 110 as part of persistent storage 408 (FIG. 4), with the capacity to facilitate the large amount of data stored as priority map 135, weather data 114, utility data 116 and image data 118. In other embodiments, storage device 170 is a combination of separate storage devices (located internally or externally of computing device 110) that are accessible by computing device 110. In yet other embodiments, storage device 170 is included in storage device 140 and is accessible by computing device 110 via network 130.

In an exemplary embodiment, weather forecaster 122 stores and retrieves data located in weather data 114 and utility data 116. In general, weather forecaster 122 uses the data stored in weather data 114 and utility data 116 to generate forecasted weather patterns for a given pathway (ROW) corridor. The aforementioned forecasted weather patterns typically include predicted average weather patterns as well as predicted severe weather patterns, such as weather patterns that exceed a threshold value. For example, a typical forecasted weather pattern includes averages of precipitation, wind speed, and temperature, as well as records of precipitations, wind speeds, and temperatures that deviated from those respective averages by twenty percent or more (i.e., severe weather patterns). In some embodiments, a series of forecasted weather patterns may be produced using various ranges of weather data (e.g., weather data covering five, ten and twenty year periods).

In an exemplary embodiment, weather data 114 is stored in storage device 170 and includes the weather history for an area that includes at least part of a ROW corridor. Typically, the weather history spans at least several years. The weather history of multiple regions or areas may need to be combined to cover an entire ROW corridor. If new weather history is required by weather forecaster 122, then weather forecaster 122 will utilize a search function to locate, access and save a copy of the new weather history as weather data 114.

In an exemplary embodiment, utility data 116 is stored in storage device 170 and includes maps showing the locations of transmission/distribution assets, which include structures such as electrical power lines and communication towers. Utility data 116 can also include geological data, topographical data, and waterway data for a ROW corridor and the surrounding areas. If weather forecaster 122 and/or map generator 120 require new utility data, then weather forecaster 122 and/or map generator 120 utilizes a search function to locate, access and save a copy of the new utility data as utility data 116.

In an exemplary embodiment, map generator 120 stores and retrieves data located in utility data 116 and image data 118. In general, map generator 120 generates 3D maps of a given ROW corridor. The generated 3D maps can include vegetation locations, vegetation densities, vegetation height, topographical data, geographical data, and waterway data for a given ROW corridor. To generate the 3D map at least two satellite images, taken from two different viewing angles, are overlaid. A computer analysis of the overlaid images generates a 3D (Recovered 3D Disparity Map) picture showing the location and densities of vegetation in or near the ROW corridor. In general, a Recovered 3D Disparity Map is generated through the computer analysis of at least two rectified images taken from different vantage points. The computer analysis yields point correspondences and computation of the apparent shift (disparity) of the point gives information about relative depth of the scene. In other words, by comparing the apparent change in point location (of an object), in two or more images, the apparent size, shape, and orientation of an object can be estimated. There are a number of available options (algorithms) which are well known in the art that are capable of performing these calculations. As such, a deeper explanation of generating recovered 3D disparity maps would exceed the scope of this discussion. To further enhance the accuracy of the 3D map known geological, topographical, and waterway data can be added to yield a highly accurate 3D map of the ROW corridor and surrounding area. In some embodiments, a variety of filters and satellite image resolutions can be combined to identify sick or dead vegetation, such as dead trees.

In an exemplary embodiment, map generator 120 uses the images stored in image data 118 for the generation of three dimensional (3D) maps of a given ROW corridor. If new overhead images are required by map generator 120 then map generator 120 will utilize a search function to locate, access and save a copy of the new overhead images as image data 118. In some embodiments, map generator 120 also includes a request program that allows map generator 120 to send commands (to, for example, satellite 160) to take new overhead images of a ROW corridor and/or nearby areas.

In an exemplary embodiment, image data 118 is stored in storage device 170 and includes overhead images taken from a number of aerial and/or outer-space vantage points. Typically, the overhead images include multiple satellite images of a given ROW corridor and can include images taken from aerial platforms airplanes, drones. In some embodiments, the images stored in image data 118 can include non-aerial/non-outer-space images, for example, survey images taken at ground level. In general, the images stored in image data 118 can be taken using a variety of spectroscopic regions, spectroscopic filters, and can include images that have been modified by a computer (i.e., a computer enhanced image).

In an exemplary embodiment, ROW analyzer program 125 combines the ROW maps, generated by map generator 120, with the weather predictions from weather forecaster 122 to generate ROW maps and schedules for ROW corridor management. In general, ROW analyzer program 125 utilizes machine-learning driven forecasting (described in further detail below) to predict which "high risk" vegetation or areas of "high risk" vegetation that will most likely produce violations of the pathway (i.e., violating objects). Once the potential violations of the pathway have been identified, ROW analyzer program 125 produces maps indicating their location along with their respective schedules for management, which are saved as priority map 135 that is stored in storage device 170. Priority map 135 includes, in general, a plan generated for pathway management. The plan typically includes a map, a prioritized list, a schedule, a location of a predicted violation of the pathway, and/or a location of a current violation of the pathway.

The machine-learning driven forecasting, used by ROW analyzer program 125, breaks the complex process of prediction/forecasting into manageable steps. In general, ROW analyzer program 125 uses ensemble-based modeling to simplify the process of forecasting and prediction. An ensemble is a large collection of weak, localized predictors that generate short-term local-level predictions of violations of the pathway (ROW risks). The ensembles may take into account the local terrain/geographic features, weather patterns, and vegetation (such as tree density) to make predictions. Each local predictor can be composed of simple predictor functions to take data inputs and render a prediction based on the input data. In general, the characteristics (e.g., weather history, geographic features, history of producing violating objects) associated with a given point are analyzed using non-parametric analysis (a type of statistical analysis). The non-parametric analysis is a simple predictor function, and the associated result is the prediction. There are a large number of possible algorithms, which are well known in the art, that can be used to perform the non-parametric analysis and a deeper discussion of this process exceeds the scope of the present disclosure. In summation, the ensemble, relies on a very large number of localized predictions.

However, the predictions/forecasts produced by ROW analyzer program 125 are not limited to the initial short-term local-level predictions of various ROW risks. ROW analyzer program 125 incorporates neighbor effects (described in further detail below) into the ensemble to create one or more large scale, long-term, regional-level or global prediction models, or any combination thereof. ROW analyzer program 125 enhances predictions, produced by the ensemble, by taking into account and/or predicting more long-range phenomenon, which yields stronger predictions. In general, each localized weak predictor, while transforming inputs into a prediction, takes into account the prediction(s) of its surrounding neighbor(s) (i.e. a cumulative neighbor effect) to make a more accurate prediction of violations of the pathway. In other words, if the neighbors of a particular weak predictor are predicting high risk then it is likely, though not necessary, that the weak predictor will yield a final high-risk prediction due to a cumulative effect from the high risk neighbors.

For example, an analysis of a dead tree yields a high probability that it may fall over in the near future. The tree is far enough away from a power line that if the tree fell over the tree would not generate a violating object. However, the tree is on a hill and when the effect of a potential, and highly probable, summer wind is taken into account a final prediction is that the tree will likely impact the power line or cause other vegetation to impact the power line, i.e., the creation of a violation of the ROW is predicted. In another example, a dead tree is located one hundred feet from the bank of a river subject to annual flooding and five hundred feet from an overflow intake of a power generating dam. A weak, localized predictor indicates that the dead tree poses little threat and will not generate a violating object. However, when the effects of an annual flood are taken into account the dead tree generates a prediction indicating a high probability of blockage formation in the overflow intake, which would pose considerable hazard to the structural integrity of the dam.

Figure 2:
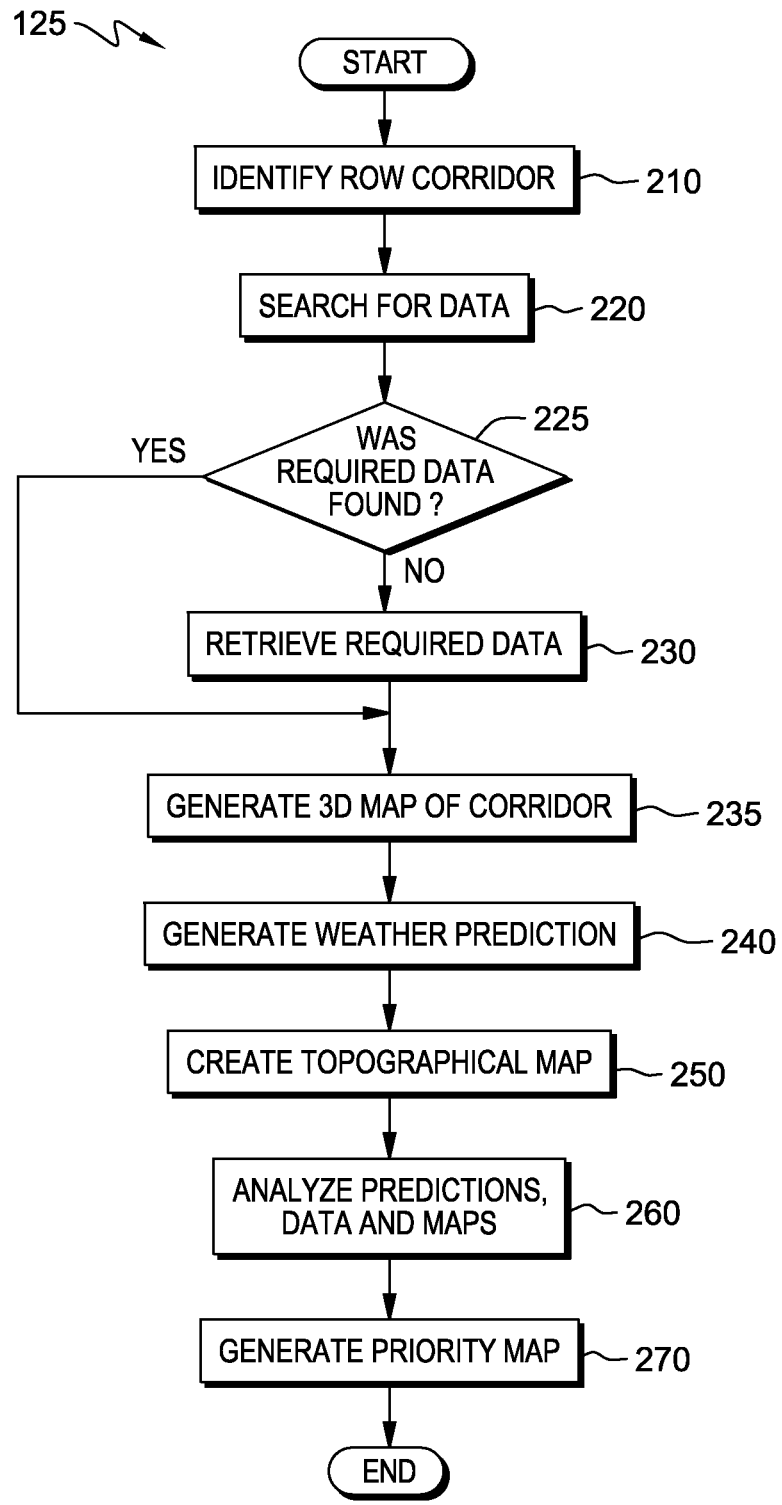
FIG. 2 illustrates operational steps of a ROW analyzer program, on a computing device within the data processing environment of FIG. 1, in accordance with an embodiment of the present invention.

FIG. 2 is a flowchart depicting the operational steps utilized by ROW analyzer program 125 for the generation of ROW maps and schedules for ROW corridor management, in accordance with an embodiment of the present invention.

In this embodiment, ROW analyzer program 125 identifies a section(s) of a ROW corridor that requires vegetation management. In general, a list of section(s) of a ROW corridor are analyzed on a scheduled basis. However, there are sections which would be more likely to require vegetation management due to water supply and average sunlight, i.e., a sunny, well watered area will be more likely to experience rapid vegetation growth. Therefore, these sections would be entered in multiple places in the list. There is also a manual entry option where a user can select a section of interest for processing. This could be of great use when, for example, a storm has been predicted. ROW analyzer program 125 then sends data identifying the section(s) of ROW corridor, which will be processed, to map generator 120 and to weather forecaster 122 (step 210).

Map generator 120 and weather forecaster 122 search weather data 114, utility data 116 and image data 118 for the required information to generate maps and weather forecasts respective to the ROW corridor and the identified section(s) of the ROW corridor (step 220). If the required information is found (decision 225, yes branch), then ROW analyzer program 125 generates maps and weather forecasts (steps 235 and 240 respectively). If the required information is not found (decision 225, no branch), then map generator 120 and/or weather forecaster 122 retrieves the required data from alternate sources such as storage device 140 and/or instructs satellite 160 to take/send the required images (step 230).

Once the required information has been retrieved and respectively saved to storage device 170 as weather data 114, utility data 116 and image data 118 then ROW analyzer program 125 executes map generation (step 235) and weather forecast prediction (step 240). ROW analyzer program 125 uses map generator 120 to analyze a series of satellite images and generate 3D maps of a ROW corridor and the identified a section(s) of the ROW corridor (step 235). The images are overlaid and analyzed to generate data values for the vegetation height, density, and distance from transmission/distribution assets. In a further spectral analysis of the images, map generator 120 identifies the type/size of vegetation (e.g., bushes, trees) as well as sick and/or dead vegetation. For example, spectral analysis shows the presence of tree trunks but not leaves. ROW analyzer program 125 then labels the trees with no leaves as dead and as having a higher probability of generating a violating object.

In an alternate embodiment, ROW analyzer program 125 can leverage previously created maps and weather patterns to determine if a new priority map should be generated. For example, a first section of an ROW corridor has produced numerous violating objects over a one year time span. The number and nature of violating objects produced exceeds an estimated (statistical) production rate for the first section. Therefore, ROW analyzer program 125 proceeds with the generation of a new priority map. In another example, a second section of an ROW corridor has produced one violating object over a one year time span. The number and nature of violating object produced falls well below an estimated (statistical) production rate for the first section. Therefore, ROW analyzer program 125 postpones the generation of a new priority map for the second section for another year.

In step 240 of this embodiment, ROW analyzer program 125 uses weather forecaster 122 to analyze weather data and create average weather patterns for an area including the ROW corridor. Weather forecaster 122 also predicts the extreme weather conditions most likely to occur near/in the ROW corridor and the identified a section(s) of the ROW corridor. For example, using the weather averages during the periods of the last five, ten, twenty five and fifty years a series of average weather patterns are produced and used to extrapolate the most probable average weather and the most probable extreme weather conditions for a ROW corridor and the surrounding area.

In this embodiment, ROW analyzer program 125 generates detailed topographical maps of the ROW corridor (step 250). First, crude topographical maps of the ROW corridor are obtained from utility data 116 and/or storage device 140. The crude topographical map typically is (or can be based on) publically available topographical maps which are then combined with the generated 3D maps of a ROW corridor. By overlaying crude topographical maps over the generated 3D maps a more detailed hybrid map (3D vegetation, and topographical) is produced. The map shows in detail the position of and height of vegetation respective to the ground and the transmission/distribution assets. The level of detail of the hybrid map can be further enhanced by overlaying images (from various vantage points and resolutions) taken in a variety of spectral regions. For example, images taken in the ultra violet and microwave regions are overlaid to enhance the detail resolution in areas of the map that are covered by water and dense vegetation. In another example, a green light filter is applied to enhance the resolution of the satellite images taken in the visible light region.

ROW analyzer program 125 analyzes data (such as known mechanical limits of materials) and maps (such as the topographical and ROW corridor maps) with respect to the predicted average weather patterns and the extreme weather conditions likely to occur near/in the ROW corridor (step 260). The analysis allows effects such as changes in wind speed due to the presence of hills and valleys to be predicted. These effects are then used to predict specific conditions that are most likely to generate potential violating objects and/or predicted violations of the pathway. ROW analyzer program 125 analyzes the hybrid map using the specific conditions that are most likely to generate potential violating objects and/or predicted violations of the pathway and assigns a priority value to them. There are two general categories of potential violating objects and/or predicted violations of the pathway that are identified. The first category includes non-weather related potential violating objects and/or predicted violations of the pathway (i.e., vegetation growth and/or dead vegetation). The second category includes weather related potential violating objects and/or predicted violations of the pathway (i.e., a tree growing on the top of a hill that will likely be uprooted during a storm and land on an electric power line).

ROW analyzer program 125 uses the prediction(s) (of step 260) to generate a priority map showing the location of vegetation (and other objects and/or conditions) that are or will likely generate potential violating objects and/or predicted violations of the pathway (step 270). A copy of the priority map and its associated information (i.e., potential violating objects and/or predicted violations of the pathway) is saved in priority map 135. The priority map and the associated information are then passed to mobile device 150, which is in the field. The operator uses the priority map information to manage the potential violating objects in a given section of ROW corridor. For example, a tree located high on the side of a hill has been identified as a potential violating object with a high priority value. The tree is removed first and then, as time permits, other potential violating objects with lower priority value are removed.

Figure 3:
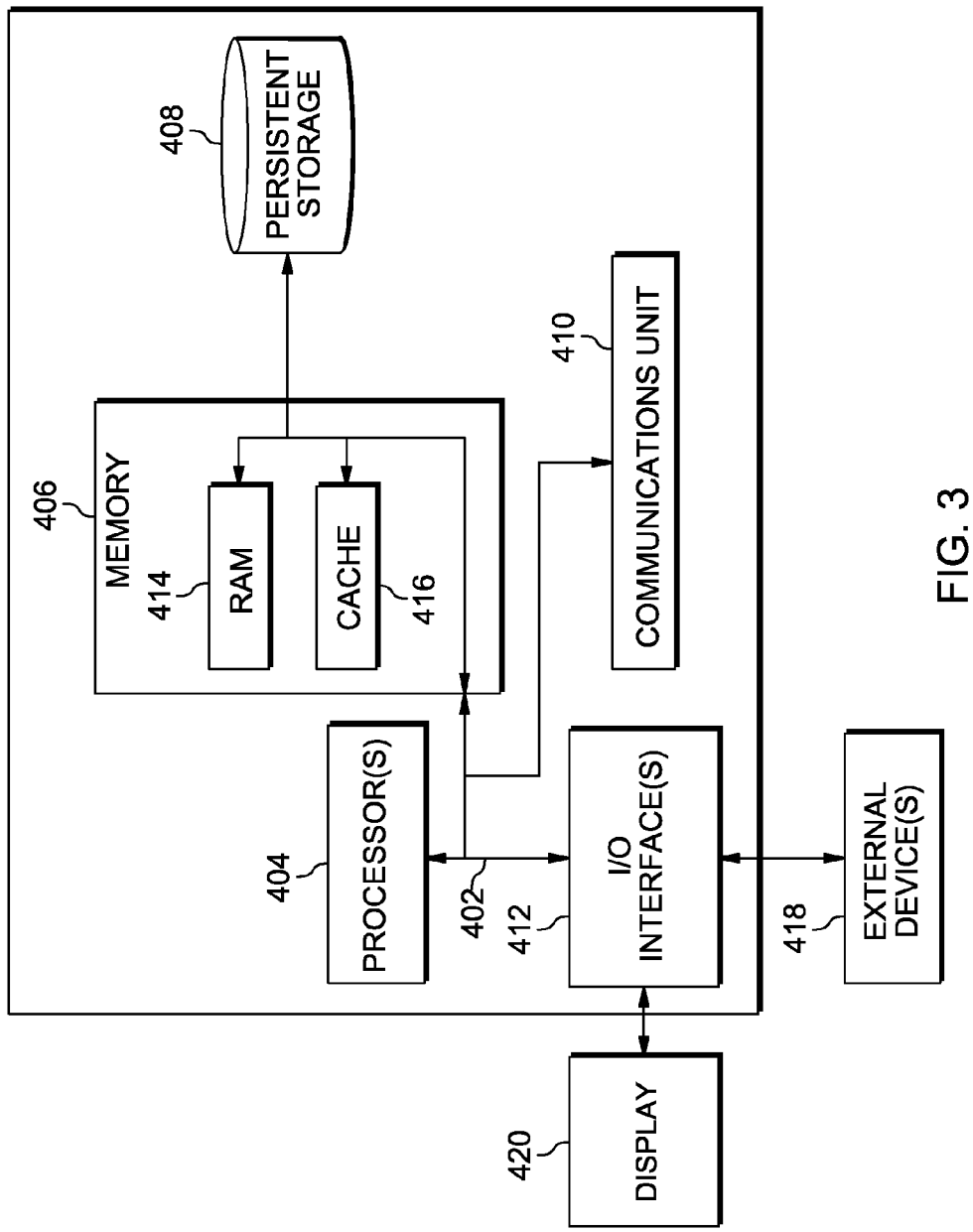
FIG. 3 depicts a block diagram of components of the computing device executing the ROW analyzer program, in accordance with an embodiment of the present invention.

FIG. 3 depicts a block diagram of components of computing device 110, satellite 160, and mobile device 150 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110, satellite 160, storage device 140, and mobile device 150 respectively include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

ROW analyzer program 125, map generator 120, weather forecaster 122, priority map 135, weather data 114, utility data 116, and image data 118 are stored in persistent storage 408, which includes storage device 170, for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of satellite 160, storage device 140, and mobile device 150. In these examples, communications unit 410 includes one or more network interface cards. Communications unit 410 may provide communications through the use of either or both physical and wireless communications links. ROW analyzer program 125, map generator 120, weather forecaster 122, priority map 135, weather data 114, utility data 116, and image data 118 may be downloaded to persistent storage 408 through communications unit 410.

I/O interface(s) 412 allows for input and output of data with other devices that may be connected to computing device 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., ROW analyzer program 125, map generator 120, weather forecaster 122, priority map 135, weather data 114, utility data 116 and image data 118, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for pathway management, the method comprising:
    a computer generating a three dimensional map of a pathway area using a plurality of overhead images;
    the computer determining a forecasted weather pattern to occur in the pathway, based on, at least in part, previous weather patterns for the pathway area;
    the computer analyzing the three dimensional map and the forecasted weather pattern to determine an object, a state of the object, and an event that are likely to cause a violation of the pathway area if the forecasted weather pattern occurs;
    the computer generating a priority for one or more likely violations of the pathway; and
    the computer generating a plan for pathway management of the pathway area based, at least in part, on the priority for the one or more likely violations of the pathway, wherein the plan guides maintenance activity that reduces a likelihood of occurrence of the violation of the pathway by the object prior to an occurrence of the forecasted weather pattern.

2. The method of claim 1, wherein the plurality of overhead images indicate one or both of a location of the object and the state of the object, and wherein the plurality of overhead images include one or more of overhead images taken from a plurality of vantage points, overhead images taken using a variety of spectroscopic regions, overhead images taken using a variety of spectroscopic filters, and overhead images that have been modified by a computer.

3. The method of claim 1, wherein the forecasted weather pattern includes one or more of an average of precipitation, an average wind speed, an average temperature, and records of precipitation, wind speed, and temperature which deviate from the respective average by a specified threshold.

4. The method of claim 1, wherein the plan for pathway management includes one or more of a map, a prioritized list, a schedule, and a location of a predicted violation of the pathway.

5. The method of claim 1, wherein the step of the computer analyzing the three dimensional map and forecasted weather pattern to determine an object, a state of the object, and an event that are likely to cause a violation of the pathway area if the forecasted weather pattern occurs includes:
    the computer generating long-term regional-level predictions by analyzing a plurality of weak predictors that generate short-term local-level predictions, wherein the long-term regional-level predictions indicate the object, the state of the object, and the event that are likely to cause the violation of the pathway area by the object.

6. The method of claim 5, wherein the analysis of the plurality of weak predictors that generates short-term local-level predictions includes an analysis of one or more of a local geographic feature, the forecasted weather pattern, and a vegetation.

7. The method of claim 5, wherein the generation of the long-term regional-level predictions includes analyzing a cumulative effect of the plurality of short-term local-level predictions.

8. A computer program product for pathway management, the computer program product comprising:
    one or more computer-readable storage media and program instructions stored on the one or more computer-readable storage media, the program instructions comprising:
        program instructions to generate a three dimensional map of a pathway area using a plurality of overhead images;
        program instructions to determine a forecasted weather pattern to occur in the pathway area, based on, at least in part, previous weather patterns for the pathway area;
        program instructions to analyze the three dimensional map and the forecasted weather pattern to determine an object, a state of the object, and an event that are likely to cause a violation of the pathway area by the object if the forecasted weather pattern occurs;
        program instructions to generate a priority for one or more likely violations of the pathway; and
        program instructions to generate a plan for pathway management of the pathway area based, at least in part, on the priority for the one or more likely violations of the pathway, wherein the plan guides maintenance activity that reduces a likelihood of occurrence of the violation of the pathway by the object prior to an occurrence of the forecasted weather pattern.

9. The computer program product of claim 8, wherein the plurality of overhead images indicate one or both of a location of the object and the state of the object, and wherein the plurality of overhead images include one or more of overhead images taken from a plurality of vantage points, overhead images taken using a variety of spectroscopic regions, overhead images taken using a variety of spectroscopic filters, and overhead images that have been modified by a computer.

10. The computer program product of claim 8, wherein the forecasted weather pattern includes one or more of an average of precipitation, an average wind speed, an average temperature, and records of precipitation, wind speed, and temperature which deviate from the respective average by a specified threshold.

11. The computer program product of claim 8, wherein the plan for pathway management includes one or more of a map, a prioritized list, a schedule, a location of a predicted violation of the pathway, and a location of a predicted violation of the pathway.

12. The computer program product of claim 8, wherein the program instructions to analyze the three dimensional map and forecasted weather pattern to determine an object, a state of the object, and an event that are likely to cause a violation of the pathway area if the forecasted weather pattern occurs includes:

program instructions to generate long-term regional-level predictions by analyzing a plurality of weak predictors that generate short-term local-level predictions, wherein the long-term regional-level predictions indicate the object, the state of the object, and the event that are likely to cause the violation of the pathway area by the object.

13. The computer program product of claim 12, wherein the analysis of the plurality of weak predictors that generates short-term local-level predictions includes an analysis of one or more of a local geographic feature, the forecasted weather pattern, and a vegetation.

14. The computer program product of claim 12, wherein the generation of the long-term regional-level predictions includes analyzing a cumulative effect of the plurality of short-term local-level predictions.

15. A computer system for pathway management, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to generate a three dimensional map of a pathway area using a plurality of overhead images;

program instructions to determine a forecasted weather pattern to occur in the pathway area, based on, at least in part, previous weather patterns for the pathway area;

program instructions to analyze the three dimensional map and the forecasted weather pattern to determine an object, a state of the object, and an event that are likely to cause a violation of the pathway area by the object if the forecasted weather pattern occurs;

program instructions to generate a priority for one or more likely violations of the pathway; and program instructions to generate a plan for pathway management of the pathway area based, at least in part, on the priority for the one or more likely violations of the pathway, wherein the plan guides maintenance activity that reduces a likelihood of occurrence of the violation of the pathway by the object prior to an occurrence of the forecasted weather pattern.

16. The computer system of claim 15, wherein the plurality of overhead images indicate one or both of a location of the object and the state of the object, and wherein the plurality of overhead images include one or more of overhead images taken from a plurality of vantage points, overhead images taken using a variety of spectroscopic regions, overhead images taken using a variety of spectroscopic filters, and overhead images that have been modified by a computer.

17. The computer system of claim 15, wherein the forecasted weather pattern includes one or more of an average of precipitation, an average wind speed, an average temperature, and records of precipitation, wind speed, and temperature which deviate from the respective average by a specified threshold.

18. The computer system of claim 15, wherein the plan for pathway management includes one or more of a map, a prioritized list, a schedule, and a location of a predicted violation of the pathway.

19. The computer system of claim 18, wherein the program instructions to analyze the three dimensional map and forecasted weather pattern to determine an object, a state of the object, and an event that are likely to cause a violation of the pathway area if the forecasted weather pattern occurs includes:

program instructions to generate long-term regional-level predictions by analyzing a plurality of weak predictors that generate short-term local-level predictions, wherein the long-term regional-level predictions indicate the object, the state of the object, and the event that are likely to cause the violation of the pathway area by the object.

20. The computer system of claim 18, wherein the analysis of the plurality of weak predictors that generates short-term local-level predictions includes an analysis of one or more of a local geographic feature, the forecasted weather pattern, and a vegetation.

\* \* \* \* \*